Oct. 5, 1943.  A. J. CHERRY  2,330,869
METHOD AND APPARATUS FOR MAKING SELF-TAPPING SCREWS
Original Filed Sept. 8, 1938   3 Sheets-Sheet 1
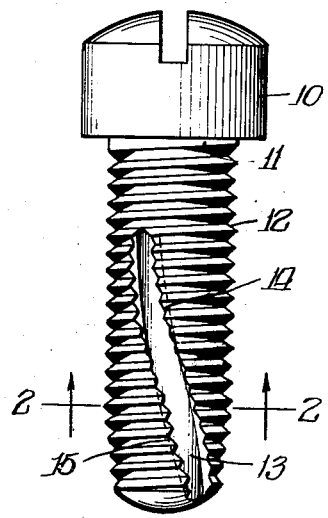
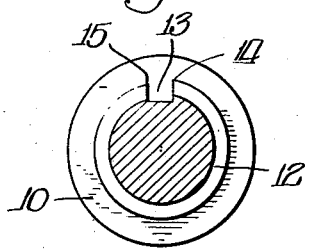
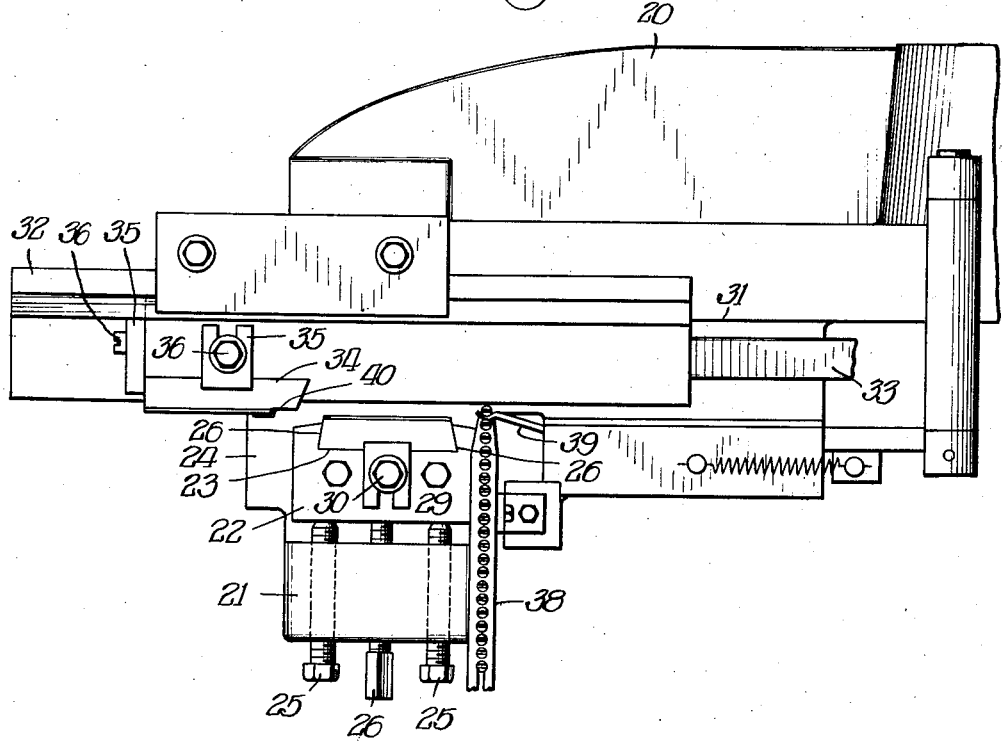
INVENTOR.
Andrew J. Cherry,
BY Williamson Huxley Byron & Knight
ATTORNEYS.

Oct. 5, 1943.   A. J. CHERRY   2,330,869
METHOD AND APPARATUS FOR MAKING SELF-TAPPING SCREWS
Original Filed Sept. 8, 1938   3 Sheets-Sheet 2

INVENTOR.
Andrew J. Cherry,
BY Wilkinson Huxley Byron & Knight
ATTORNEYS.

Oct. 5, 1943. A. J. CHERRY 2,330,869
METHOD AND APPARATUS FOR MAKING SELF-TAPPING SCREWS
Original Filed Sept. 8, 1938 3 Sheets-Sheet 3
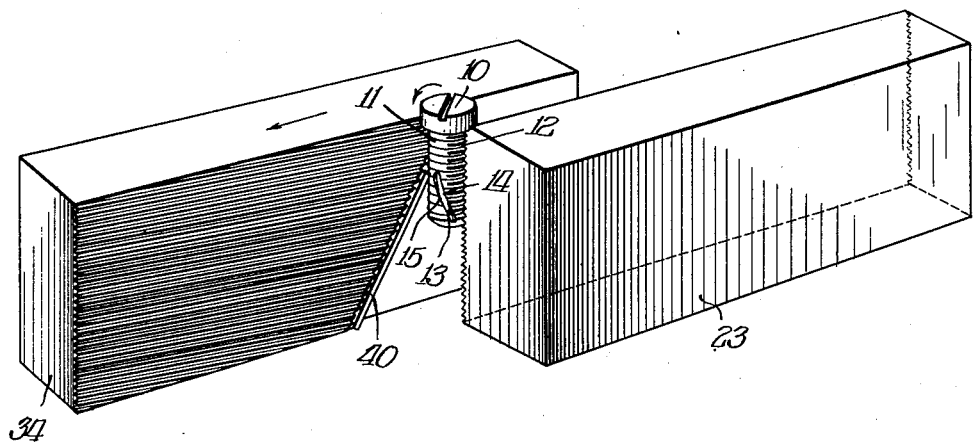
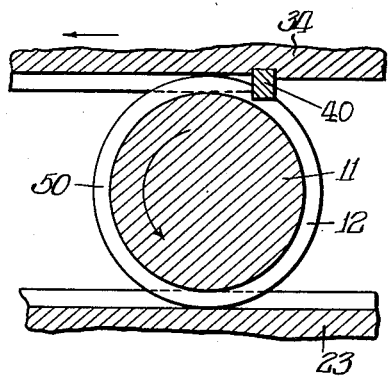
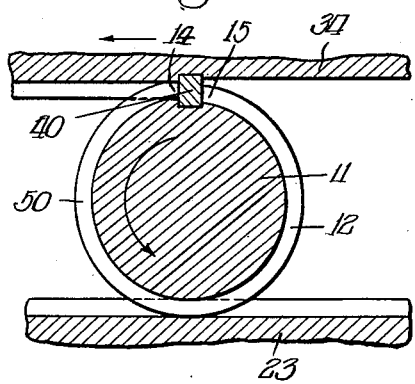
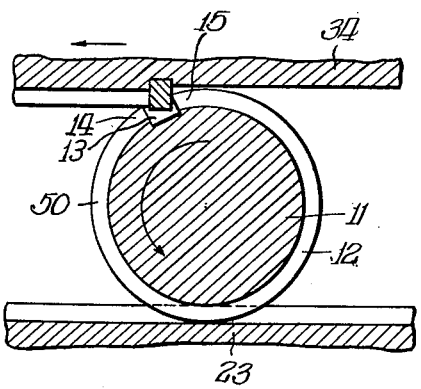
INVENTOR.
Andrew J. Cherry,
BY Wilkinson, Huxley, Byron & Knight
ATTORNEYS.

Patented Oct. 5, 1942

2,330,869

UNITED STATES PATENT OFFICE 2,330,869

METHOD AND APPARATUS FOR MAKING SELF-TAPPING SCREWS

Andrew J. Cherry, Chicago, Ill., assignor to Economy Screw Corporation, Chicago, Ill., a corporation of Illinois Original application September 8, 1938, Serial No. 228,904, now Patent No. 2,302,675, dated November 24, 1942. Divided and this application August 12, 1939, Serial No. 289,732

6 Claims. (Cl. 80—8)

This invention relates to improvements in self-tapping screws.

This invention also relates to a novel method for making the self-tapping screws of this invention by a rolling operation which may be conducted with the usual machinery utilized for rolling threads on screws.

This invention further relates to novel apparatus for carrying out the process of this invention and for making the novel self-tapping screws here referred to.

This application is a division of my copending application Serial No. 228,904, filed September 8, 1938, which has matured into Patent No. 2,302,675, of November 24, 1942, for improvement in Self-tapping screws and method of making same.

It is an object of this invention to provide an improved self-tapping screw which may be equipped with standard threads and which has cutting edges formed on the screw without cutting away or in any manner removing the metal of the blank from which the screw is made.

It is a further object of this invention to provide self-tapping screws which are stronger than screws of this type used prior to this invention and which do not have a slot or slots cut deeply into the body thereof.

A further object of this invention is to provide a self-tapping screw which has a groove extending longitudinally, angularly or spirally with respect to the shank of the screw, which is depressed into the shank with a displacement of the metal in a particular manner to provide cutting edges along one edge of the groove.

It is a further object of this invention to provide a self-tapping screw which may be manufactured by thread rolling dies of the conventional type, with a very simple and inexpensive addition to such dies which does not increase the cost or procedure of such manufacture.

It is a further object to provide a self-tapping screw which may be made by a single rolling operation without requiring additional handling or processing steps.

It is a further object to provide a novel process for making self-tapping screws by employing thread-rolling dies equipped with one or more groove-forming blades which deform the shank of the screw to provide the self-tapping feature thereof.

It is a further object of this invention to provide simple and inexpensive and yet highly efficient mechanism for use in the production of the screws of this invention.

These and other objects not specifically enumerated are contemplated for this invention, as will readily appear to one skilled in the art as the following description proceeds. The disclosure of the invention in this application is given merely by way of example and is not intended to limit the invention in any respect, as the scope of the invention is to be determined from the appended claims when given the broadest possible interpretation permitted by the prior art.

Referring to the drawings—

Figure 1 is an enlarged elevational view of a screw constructed in accordance with this invention;

Figure 2 is a cross-sectional view taken through the shank of the screw shown in Figure 1 on the line 2—2 and looking in the direction of the arrows and showing the formation adjacent the edge of the groove somewhat exaggerated so as better to illustrate the characteristics of the invention;

Figure 3 is a plan view of a conventional form of thread-rolling machine having dies constructed to form the screws of this invention;

Figure 4 is a side elevational view, partly in cross-section, taken on the line 4—4 of Figure 3 and looking in the direction of the arrows;

Figure 5 is an end elevational view of the machine illustrated in Figure 3 looking from left to right;

Figure 6 is an enlarged perspective view showing the novel die blocks and the screw blank during the threading and grooving operation; and Figures 7, 8 and 9 are three enlarged cross-sectional views showing a screw blank and the associated die blocks in successive positions during the grooving of the screw blank and showing the results of the die somewhat exaggerated in order better to illustrate the character of the grooving operation.

By referring to the drawings, and particularly to Figure 1, it will be noted that the screw here illustrated comprises a head 10 having a shank 11 equipped with suitable screw threads 12, which are preferably standard threads made by the usual screw rolling dies in accordance with conventional practice. The lower end of the screw is slightly tapered, as shown in Figure 1, to enable it to start its thread-cutting action when it is screwed into an opening. This can be provided in any convenient manner, as for instance, in accordance with conventional practice, by tapering the end of the blank initially prior to the thread-rolling operation.

The self-tapping feature of the screw is provided by means of a groove 13, which may extend axially along the shank, angularly with respect thereto, or spirally therearound, as shown. This construction is characterized by having the thread edges on one side of the groove, such as the right hand side, represented at 14 in Figure 1, slightly higher than the thread edges on the opposite side 15 of the groove. This construction results from the particular method of making the screws and will be hereinafter more fully explained.

It will be noted, however, that the side or edge of the groove is determined with respect to the character of the threads on the screw, so that as the screw advances into the hole in which it is to be screwed, the cutting edges present themselves at the trailing side of the groove with sharp cutting edges exposed at each thread for performing the self-tapping function.

The groove also provides a space into which the chips cut from the metal or other material may fall in the usual way.

It is apparent that any number of grooves 13 may be provided around the periphery of the screw, and this invention contemplates the use of one, two, three, or more, according to the necessities of the particular case.

This groove is further characterized in that it is depressed into the metal by a blade which causes the metal to flow in the desired manner, whereby the cutting edge is provided and the necessary shape is given to the shank of the screw without removing any of the original metal of the screw blank. This feature results in the production of a screw which is superior in strength to screws of this type now in use, which usually have slots, or cut-away or other deformed or weakened portions.

The configuration of the groove 13 is shown in Figure 2 with an upstanding edge 14, somewhat exaggerated to illustrate the character of the cutting edge. From this figure it will be noted that the edge 14 extends upwardly beyond the normal circumference of the screw shank and that the opposite edge 15 is slightly lower than the edge 14.

By referring to Figures 3 to 5, inclusive, it will be noted that a screw thread rolling machine of conventional construction is there disclosed, which comprises a frame 20 having an upstanding portion 21 adapted adjustably to receive the supporting block 22, which serves as a mounting for a stationary die block 23. The supporting block is mounted on a step 24 and is adapted to be adjusted toward and away from a movable die block by means of screws 25 having swivel engagement with the supporting block 22 and threaded engagement with the portion 21 of the frame. After proper adjustment of the supporting block 22 the block is anchored in position by means of a holding screw 26, which is likewise threaded in the frame part 21 and adapted for abutment with the holding block 22.

The holding block 22 is provided with a dovetail opening 26, in which is positioned the stationary die block 23 formed of corresponding shape. The die block 23 is held against accidental movement by means of a plate 29 and holding screw 30. On the opposite side of the frame 20 a slide guideway 31 is provided for receiving a reciprocating carriage 32. This carriage is best shown in Figures 4 and 5. The reciprocation thereof is effected by means of a pitman 33 operated by a crank from a suitable source of power (not shown). The reciprocating carriage is provided with a suitable opening for mounting the movable die block 34, which is held in place by means of clamping plates 35 and bolts 36.

The screw blanks are positioned in a container or hopper 37 and are conveyed by a pick-up device of conventional construction in single file down a guideway 38.

The guideway is kept full of screw blanks, as shown in Figures 3 and 5, and the screws move forwardly therein by gravity as the lowermost screw in the guideway is fed for rolling movement between the die blocks for each successive reciprocation of the machine. The positioning of the screw between the die blocks is caused by a moving finger 39, which is operated in synchronism by conventional mechanism (not shown).

By referring to Figure 6 it will be noted that the moving or floating die block 34 has provided on its inner face adjacent to its trailing end a blade 40 inset into the face of the die block, preferably at an angle, substantially as shown, and preferably extending from the bottom edge of the die block to a position adjacent to the top but preferably below the top edge.

This blade will, of course, vary in dimension, depending upon the particular operation and the size of the screws being made, but it is preferable to have the blade extend outwardly beyond the edges of the threads on the die block by approximately one-quarter of the depth of the thread grooves. By way of example, if the thread grooves are .020 of an inch deep the block may extend .005 of an inch outwardly beyond the upper edges of the threads on the block. Furthermore, the width of the blade can vary according to conditions, but it is found to produce a satisfactory groove in the screws when its width is from approximately one-fifth to one-seventh of the outside diameter of the screw being manufactured.

It will also be noted that when the blade is angularly disposed, as shown in Figure 6, it is preferably inclined in a direction to run across the threads, whereby during the rolling operation the groove will be spirally disposed around the shank of the screw. This angular disposition of the blade further minimizes strain and work of the deforming action caused by the blade in any one instant during the passing of the screw blanks over the blade and makes for an advantage on this account. It is apparent, however, that the blade might be vertically disposed so as to make a longitudinal groove in the shank of the screw, or for that matter disposed in any other convenient way.

As shown in Figure 6, as the screw travels with relation to the face of the floating die block 34 the lower end of the screw first engages the blade, and as the screw passes over the blade the groove is formed progressively from the bottom of the screw upwardly toward the top.

As further shown in Figure 6, the threading grooves on the trailing end of the floating die block 34, that is—on the far side of the blade, are cut away to provide a clearance, so that the particular formation given to the screw by the threads and the blade will not be altered or modified after the screw passes over the blade 40.

The particular character of the action of the blade is illustrated in an exaggerated degree in Figures 7, 8 and 9, where it will be noted the screw blank 50 is shown in successive positions while passing over the blade 40. On account of the direction of movement of the blank 50, it so happens that the flowing of the metal caused by the blade 40 results in a slight enlargement, as at 14, along the edge of the groove which is formed by the initial contact with the blade 40. This edge, which is clearly shown in Figure 2, is the cutting edge of the groove during the self-tapping operation of the screw. This deformation, though slight, is nevertheless definitely present in the screws so made and is quite positive in its self-tapping action.

The illustration of the action which produces this deformation as shown in Figures 7 to 9, inclusive, is crude and is only intended to be representative of the principle involved, and is included primarily to show that the edge of the groove which first contacts the blade is, in fact, slightly raised by a flowing of the metal to provide a cutting edge which extends slightly above the opposite edge of the groove.

It will thus be seen that self-tapping screws can be made in accordance with this invention by means of the usual thread-rolling machinery and by the customary operations, it merely being required that the screw threading blocks be constructed to include a suitable groove forming blade 40. If desired, two blades 40 may be included, which may be mounted in the same block, or one may be mounted in the floating block and one in the stationary block. Also other blades may be provided if three or more grooves are desired.

It is further apparent that the screw of this invention is much stronger than screws of this type heretofore employed, because all of the metal of the screw blank is present and no deep cuts or slots are utilized.

Finally, among the other advantages is the advantage that all groove-forming operations as separate steps are eliminated, because the groove of the screw of this invention is provided during the thread-rolling operation, with the result that when the screw is rolled through the threading machine it is automatically grooved in the desired way to provide a finished screw which after hardening is ready for use.

I claim:

1. A method of making a self-tapping screw which comprises rolling a screw blank between threading die blocks and passing the same over a single flat-topped blade carried by one of said die blocks and by the action of said blade, depressing a single flat-bottomed groove therein.

2. A method of forming a self-tapping screw comprising rolling a screw blank between threading die blocks to roll a thread thereon, passing said blank over a blade to form a groove therein across said threads by deforming the metal of said blank and flowing the metal outwardly adjacent to one edge of said groove to form a slightly raised cutting edge therefor.

3. A method of forming a self-tapping screw which consists in rolling a screw blank between a pair of threading dies, one of which has a single flat-topped blade mounted therein, and causing the screw blank to pass over the threads of said dies and said blade and thereafter freeing said screw blank from said dies.

4. A method of forming a self-tapping screw which comprises rolling a screw blank between threading dies, causing said screw blank to pass progressively over a blade which depresses a groove therein, and causing the metal during the formation of said groove to flow to provide a slightly raised edge on one side of said groove so as to form a thread-cutting edge on said screw.

5. A method of forming a self-tapping screw which comprises rolling a screw blank between threading dies and causing the threaded screw blank to engage and pass over a blade by progressive engagement between the screw blank and blade from the bottom of said screw upwardly of the shank thereof, and flowing the metal during the formation of said groove to provide a raised edge on said groove, constituting a cutting edge for said screw.

6. In combination with a screw thread rolling machine, die blocks therefor and a single flat-topped groove-forming blade mounted in one of said die blocks, said blade extending diagonally across the threads of its associated die block in such direction as first to engage the lower end of the said screw blank during the screw-rolling operation.

ANDREW J. CHERRY.